United States Patent Office 3,143,131
Patented Aug. 4, 1964

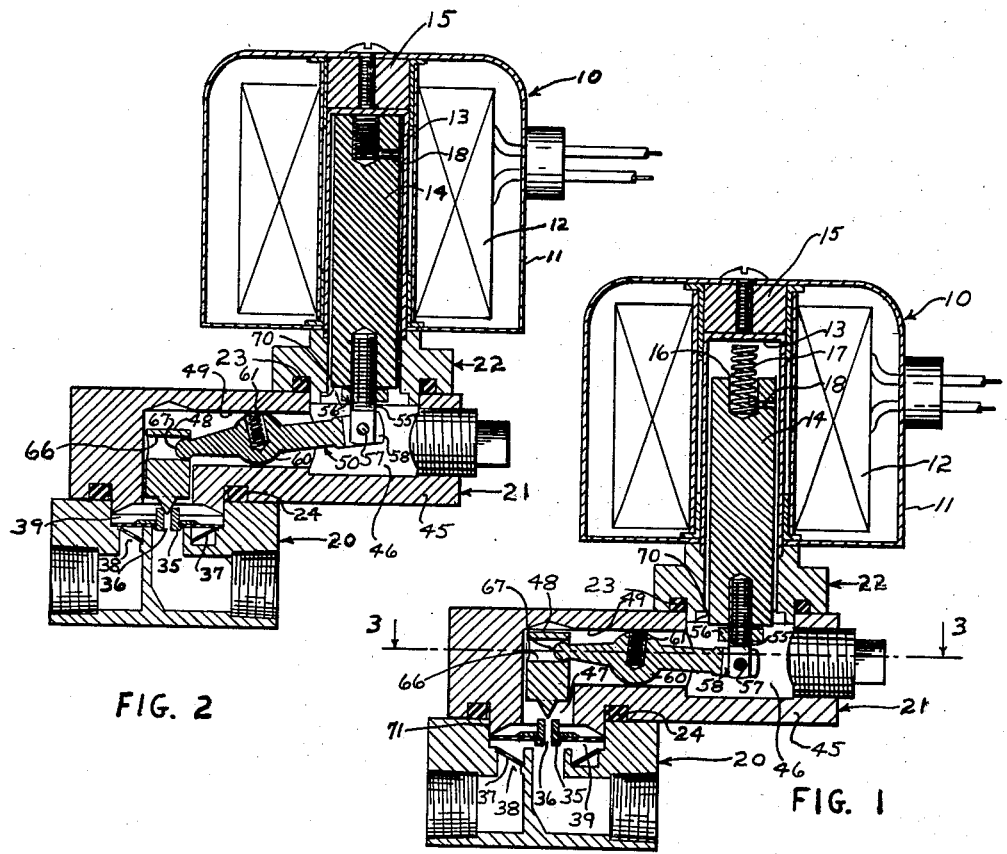
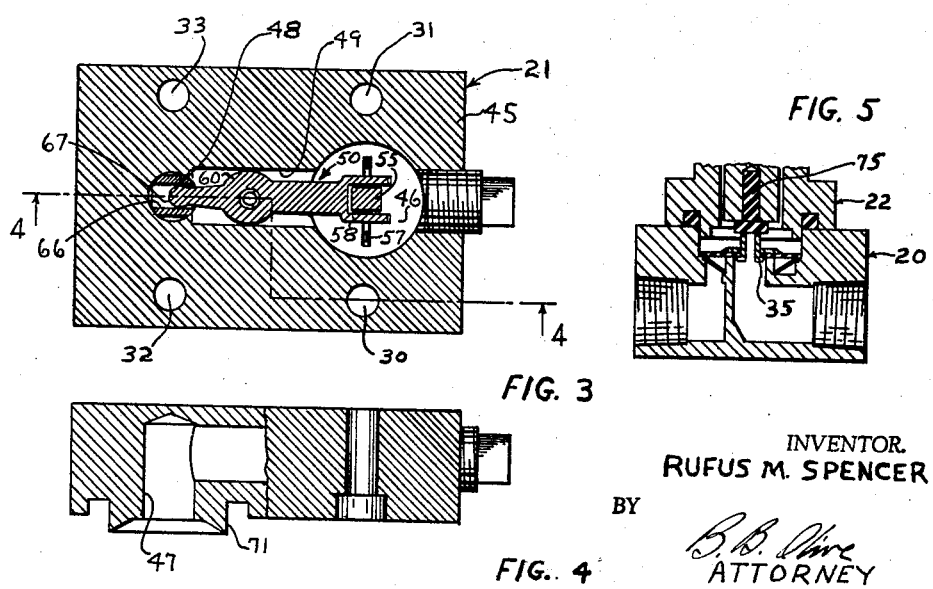
Aug. 4, 1964  R. M. SPENCER  3,143,131
CONVERTIBLE NORMALLY CLOSED TO NORMALLY
OPEN SOLENOID VALVE CONSTRUCTION
Filed Dec. 26, 1962
INVENTOR.
RUFUS M. SPENCER
BY
ATTORNEY

3,143,131
CONVERTIBLE NORMALLY CLOSED TO NORMALLY OPEN SOLENOID VALVE CONSTRUCTION
Rufus M. Spencer, Cana, Va., assignor to U-Stretch Corporation, Mount Airy, N.C., a corporation of North Carolina
Filed Dec. 26, 1962, Ser. No. 247,026
12 Claims. (Cl. 137—269)

This invention relates to solenoid controlled valves and particularly to an apparatus that enables the major components of a normally closed type solenoid valve to be utilized in a normally open type valve. The invention provides a valve construction which in one arrangement acts normally closed and in another arrangement acts normally open. The invention is especially suited to converting normally closed, relatively low operating pressure, pilot operated as well as direct acting valves to normally open, relatively high operating pressure valves.

Solenoid controlled direct acting as well as pilot operated valves find widespread use in applications calling for ports fractions of an inch in size and for both normally open and normally closed types. Generally speaking, the major components of a normally closed valve are not adaptable to being used in a normally open valve or vice versa. It is also generally true that solenoid size limits the maximum operating pressure in valves of this kind since the amount of pressure determines, in general, the size of solenoid required and it is desirable to keep both the wattage and size of the solenoid at a minimum. While normally closed solenoid valves are available for the applications in question, it is particularly noticeable that small size, low wattage, fractional inch port size, relatively high operating pressure, in the order of 600 pounds per square inch, valves of the normally open type are not readily available.

A principal object of the present invention therefore is to provide a solenoid valve structure especially suited to fractional inch port size, normally open, relatively high operating pressure valves.

Another object is to provide an apparatus which allows a normally closed, relatively low operating pressure solenoid valve to be readily converted to a relatively high operating pressure normally open valve.

Another object is to provide a valve structure by which a relatively low wattage solenoid designed for low pressure valve operation can be made to operate a relatively high pressure valve through a supplementary lever action connected between the solenoid and the valve.

Another object is to provide a novel lever arrangement and housing which can be interposed between the conventional solenoid and valve housings of a solenoid type valve for the purpose of increasing the valves operating pressure and converting it from normally closed to normally open operation.

Another object is to provide an assemblage of valve components which may be arranged either for normally open or normally closed operation.

These and other objects will appear as the description proceeds. In the drawings:

FIGURE 1 is a vertical cross-section view of a solenoid, pilot-operated valve embodying the invention, the valve being shown open as when deenergized.

FIGURE 2 is a vertical cross-section view like FIGURE 1 except the valve is shown closed as when energized.

FIGURE 3 is a horizontal section view taken on the line 3—3 in FIGURE 1.

FIGURE 4 is a vertical offset section view taken on the line 4—4 in FIGURE 3 and with certain lever mechanism eliminated for purposes of illustration.

FIGURE 5 is a partial vertical cross-section illustrating how the solenoid plunger may be adapted to a normally closed type operation.

Referring to the drawings in which like numerals refer to the same parts, the invention is shown applied to a pilot operated valve. In the drawing 10 indicates generally a solenoid of conventional construction and includes a housing 11 within which is mounted a coil 12. An armature enclosing tube 13 is fixedly mounted within the coil 12 and within this tube resides the armature plunger 14.

The upper end of tube 13 receives a plug member 15. A cavity 16 is provided in armature 14 within which is positioned a compression spring 17 that always tends to force armature 14 away from plug member 15. A pin 18 is provided to hold spring 17 in place.

The valve body as shown includes a lower section 20, an intermediate section 21, and an upper section 22, the tube 13 being secured in the section 22 of which it is in effect an integral part. Annular gasket rings 23 and 24 are provided between section 22 and section 21 and between section 21 and section 20 respectively. Section 21 is secured to section 22 by a pair of screws, not shown, fitted in holes 30, 31 and section 20 is secured to section 21 by a similar pair of screws, not shown, fitted in holes 32, 33. Section 20 is fitted with a conventional amplifying member 35 that includes a pilot port 36 and is also fitted with a conventional annular screen member 37, screen member 37 being mounted in a chamber portion 38 which connects with a chamber 39 in which amplifying member 35 is freely positioned.

Reference is made next to the intermediate section 21 and the components associated with section 21. Section 21 includes a rectangular block member 45 in which are provided three interconnecting chambers namely a vertical chamber 46 open at the top and adapted to receive armature 14; a vertical chamber 47 open at the bottom and adapted to receive a needle valve 48 hereafter referred to and a horizontal chamber 49 adapted to house a rocker lever 50 also hereafter referred to.

As will be readily seen from the drawings, the linkage housed by section 21 provides a means for multiplying the effective force of solenoid 10 and for converting the solenoid action to a normally open type action. That is, by connecting the "short arm" of lever 50 to needle valve 48 and the "long arm" to armature 14 the operating pressure may be substantially increased. Such linkage includes an eye pin 55 threaded into the bottom of armature 14 and adjustably positioned by means of a lock nut 56. The "eye" portion of pin 55 loosely receives a pin 57 which also passes through a clevis like bifurcated end 58 of rocker lever 50. Rocker lever 50 receives its pivoting action by having its middle portion formed as an integral enlarged portion preferably as a spherical ball shape 60. That is, the lever 50 rocks on the ball shape 60 as the armature plunger 14 transmits force to lever 50.

In reference to the ball shape 60, it will be noted that a spring 61 is fitted in a cavity provided at the top of ball 60. Spring 61 acts as the pivot point each time armature 14 draws into coil 12 and also acts to take up wear in the linkage and to allow some play in the linkage in order that the armature may always be drawn full in. It is believed that such a spring loaded pivot is entirely unique in the solenoid valve art. Also of interest at this point is the fact that the previously mentioned needle valve 48 is loosely connected to the lever arm 50 the end of which is also formed as a ball shape 67 and which in turn is loosely fitted in a hole 66 that passes through needle valve 48 as indicated. By reason of the loose, unfixed connections at the needle valve 48 and at the pivoting ball 60, assembly of the lever system is greatly facilitated.

Of particular significance to the invention is the fact that the upper portion of the valve which includes the solenoid 10 and the upper section 22 and the lower portion of the valve which includes the lower section 20 together with the basic components customarily associated with these portions in a normally closed type valve may be utilized with only slight modifications as the normally open type valve shown in the drawings. The example chosen to illustrate the invention is in fact based on a modification of the normally closed model 2P2 solenoid pilot amplifier type valve sold by Jackes-Evans Manufacturing Company of Saint Louis, Missouri. Those familiar with this type valve will recognize that the normally open valve of the invention may be produced essentially by separating the conventional lower section 20 and upper section 22 and inserting between these two conventional sections the intermediate section 21 with its associated linkage as previously described. To facilitate this conversion from normally closed to normally open type valve the screw holes 30, 31, 32, 33 are preferably arranged such that the two screw holes which are conventionally provided in the mentioned 2P2 valve for holding the corresponding section 20 to the corresponding section 22 can still be utilized for holding the respective sections to the intermediate section 21.

To further facilitate utilization of the conventional sections 20 and 22 in a normally open type valve, the intermediate section block member 45 is adapted to receive the annular ring member 70 of upper section 22 at the top of the vertical chamber 46. The block member 45 is further provided with an annular downward extension 71 which seats in the lower 20 section where the annular ring member 70 would ordinarily seat were the two sections 20 and 22 connected together as in a normally closed type valve. By this it can be seen that by arranging the screw holes in block member 45 as described and by designing the upper and lower surfaces of the block member to receive respectively the conventional section 22 and the conventional section 20, absolutely no modification is required in the shape or screw arrangement of sections 20 and 22 in order that they may be utilized in the normally open type valve of the invention. The conversion from normally closed to normally open type thus utilizes essentially the same components with the exception of the armature structure being slightly modified and the addition of the intermediate section 21 with the linkage it contains.

In FIGURE 5 a portion of sections 20 and 22 are shown as they may be employed in a conventional normally closed type valve. In this figure, 75 represents a detachable pad which can be mounted into armature 14 interchangeably with pin 55. In accordance with conventional practice, as for example shown in Patent 2,738,157 to F. J. Vargo, pad 75 may thus serve to close the port of amplifier member 35.

In operation, it will be understood that in the valve illustrated in FIGURES 1 and 2 when the coil 12 is deenergized, the needle valve 48 will be lifted and the fluid will flow through the outlet port as indicated in FIGURE 1. When energized, the needle valve 48 will be forced down and the fluid flow will be stopped as represented by the position of the valve components in FIGURE 2.

Of special significance to the simplicity of the invention is the fact that the lever linkage may be quickly installed and removed. That is, since the pivot point of lever 50 is in effect found in the ball shape 60 and spring 61 as previously mentioned and since the connection made by pin 57 is the only fixed connection to lever 50, assembly of lever 50 requires only that the ball shape 67 at the end of lever 50 be placed in the hole 66 of valve 48 and that the pin 57 be mounted as shown.

In summary, the invention basically provides an assemblage of three major valve components two of which may be combined to form a normally closed type valve and the three of which may be combined to form a normally open type valve of substantially higher operating pressure. In effecting the invention, there is employed what is believed to be a unique lever action in the solenoid art. While generally applicable to both pilot and direct acting valves, the invention when applied to pilot amplifier type valves employs a detachable port closing pad on the armature such that the armature may be readily connected to the lever linkage of the invention for normally open type operation. While lever systems, per se, are old in the solenoid valve art it is believed that the present invention is the first to suggest interchangeable normally open and normally closed constructions and more specifically to show the particular lever system described that may be combined with a normally closed valve construction to produce a normally open type valve construction.

Having explained my invention, what I claim is:

1. In a solenoid operated valve of the type having a first housing assembly in which is located a chamber and a valve member positioned within the chamber and moveable into and out of engagement with a valve seat located adjacent an outlet port in said housing and having a second housing assembly including a tube enclosing said solenoid and a spring loaded armature plunger actuated by said solenoid, said first and second housing assemblies having mating surfaces normally adapted to being secured together with said plunger controlling said valve member normally closed, the improvement which renders said first and second housing assemblies employable in a normally open type valve operation comprising, a third housing assembly adapted to being fixedly secured to and between said first and second housing assemblies, said third housing assembly having one mating surface adapted to being secured to the mating surface of said first housing assembly and having another mating surface laterally and vertically offset from the first adapted to being secured to the mating surface of said second housing assembly and having a chamber extending between openings located at each of said third housing mating surfaces, said third housing chamber being designed to communicate at one end with said first housing chamber and at the other end with said second housing tube, a rocker lever mounted in said third housing chamber, means adapted to connect one arm of said lever with said armature plunger, means connected to the other arm of said lever and adapted to control the position of said valve member, said first housing assembly including said valve member thereby being adapted to operate as normally open.

2. In a solenoid operated valve as claimed in claim 1 in which said valve is of the pilot amplifier type.

3. In a solenoid operated valve as claimed in claim 1 in which said rocker lever is characterized by having freely mounted in said chamber an enlarged integral ball like portion between said arms adapted to furnish the pivot point for said lever.

4. In a solenoid operated valve as claimed in claim 3 in which said ball like portion mounts a spring adapted to be compressed when said solenoid is energized.

5. In a solenoid operated valve as claimed in claim 1 in which said valve member comprises a pilot amplifying type valve member and said means connected to said other arm of said lever comprises a needle valve adapted to close the port of said amplifying type valve member.

6. In a solenoid operated valve as claimed in claim 1 in which said lever is characterized by having a free unfixed connection at its pivot point, a free unfixed connection at said other arm and a fixed connection only at said plunger thereby facilitating assembly of said lever in said third housing and making of said connections.

7. In a solenoid operated valve as claimed in claim 1 in which said one arm constitutes a long arm and said other arm constitutes a short arm, said valve member thereby being adapted to operate both as normally open and at substantially higher pressure.

8. A multi-purpose solenoid operated valve assemblage, said assemblage including a first housing assembly in which is located a chamber and a valve member positioned within the chamber and moveable into and out of engagement with a valve seat located adjacent an outlet port in said housing, a second housing assembly including a tube enclosing said solenoid and a spring loaded armature plunger actuated by said solenoid, said first and second housing assemblies having mating surfaces adapted to being secured together with said plunger controlling said valve member whereby to form a normally closed type valve, a third housing assembly adapted to being fixedly secured to and between said first and second housing assemblies, said third housing assembly having one mating surface adapted to being secured to the mating surface of said first housing assembly and having another mating surface laterally and vertically offset from the first adapted to being secured to the mating surface of said second housing assembly and having a chamber extending between openings located at each of said third housing mating surfaces, said third housing chamber being designed to communicate at one end with said first housing chamber and at the other end with said second housing tube, a rocker lever mounted in said third housing chamber, means adapted to connect one arm of said lever with said armature plunger, means connected to the other arm of said lever and adapted to control the position of said valve member, said first, second and third housing assemblies thereby being adapted when secured together to form a normally open type valve.

9. In a multi-purpose solenoid operated valve assemblage as claimed in claim 8 in which said valve member comprises a pilot amplifying type member and in which the said controlling of said valve member is effected by a detachable pad mounted on the end of said plunger and engageable with the port of said amplifying member.

10. In a multi-purpose solenoid operated valve assemblage as claimed in claim 8 in which said one arm constitutes a long arm and said other arm constitutes a short arm thereby further adapting said first, second and third housing assemblies when secured together to form a substantially higher operating pressure valve than when only said first and second housing assemblies are secured together.

11. In a multi-purpose solenoid operated valve assemblage as claimed in claim 8 in which said lever is characterized by having a free unfixed connection at its pivot point, a free unfixed connection at said other arm and a fixed connection only at said plunger thereby facilitating assembly of said lever in said third housing and making of said connections.

12. In a multi-purpose solenoid operated valve assemblage as claimed in claim 8 in which said rocker lever is characterized by having freely mounted in said chamber an enlarged integral ball like portion between said arms adapted to furnish the pivot point for said lever and in which said ball like portion mounts a spring adapted to be compressed when said solenoid is energized.

References Cited in the file of this patent
UNITED STATES PATENTS

| | | |
|---|---|---|
| 1,616,130 | Knox | Feb. 1, 1927 |
| 1,716,705 | McEwan | June 11, 1929 |
| 2,329,254 | Dorman et al. | Sept. 14, 1943 |
| 2,549,188 | Forsnas | Apr. 17, 1943 |
| 2,935,086 | Lehman et al. | May 3, 1960 |